US009787722B2

(12) United States Patent
Knjazihhin et al.

(10) Patent No.: US 9,787,722 B2
(45) Date of Patent: Oct. 10, 2017

(54) INTEGRATED DEVELOPMENT ENVIRONMENT (IDE) FOR NETWORK SECURITY CONFIGURATION FILES

(71) Applicant: Cisco Technology, Inc., San Jose, CA (US)

(72) Inventors: Denis Knjazihhin, Lexington, MA (US); Yedidya Dotan, Newton, MA (US); Zachary D. Siswick, Framingham, MA (US); Christopher Duane, Groton, MA (US); Daniel Hollingshead, Somerville, MA (US)

(73) Assignee: Cisco Technology, Inc., San Jose, CA (US)

( * ) Notice: Subject to any disclaimer, the term of this patent is extended or adjusted under 35 U.S.C. 154(b) by 108 days.

(21) Appl. No.: 14/755,228

(22) Filed: Jun. 30, 2015

(65) Prior Publication Data

US 2016/0344773 A1    Nov. 24, 2016

Related U.S. Application Data

(60) Provisional application No. 62/163,523, filed on May 19, 2015.

(51) Int. Cl.
*H04L 29/00* (2006.01)
*H04L 29/06* (2006.01)
(Continued)

(52) U.S. Cl.
CPC ........ *H04L 63/20* (2013.01); *G06F 17/30106* (2013.01); *G06F 17/30598* (2013.01); *G06F 21/57* (2013.01); *G06F 21/604* (2013.01)

(58) Field of Classification Search
CPC .............. H04L 63/20; G06F 17/30598; G06F 17/30106
See application file for complete search history.

(56) References Cited

U.S. PATENT DOCUMENTS 7,003,562 B2   2/2006  Mayer
7,146,639 B2  12/2006  Bartal et al.
(Continued)

OTHER PUBLICATIONS

Richard J. Macfarlane, "An Integrated Firewall Policy Validation Tool", A thesis submitted in partial fulfilment of the requirements of Edinburgh Napier University for the Degree of Master of Science, in the Faculty of Engineering, Computing & Creative Industries, Sep. 2009, 148 pages.

(Continued)

*Primary Examiner* — Mohammad A Siddiqi
(74) *Attorney, Agent, or Firm* — Edell, Shapiro & Finnan, LLC

(57) ABSTRACT

An integrated development environment (IDE) preprocesses a configuration file including security rules. The preprocessing maps object names in the security rules to associated object values based on object definitions for the object names. Responsive to the configuration file being opened in an editor, the IDE provides the editor with access to preprocessing results. Each security rule in the opened configuration file is searched for object names. The IDE links each object name found in the search to an associated object value mapped thereto by the mapping performed during the preprocessing. The IDE receives a selection of an object name in a security rule of the opened configuration file and generates for display the associated object value linked to the selected object name.

18 Claims, 11 Drawing Sheets

(51) Int. Cl.
    *G06F 17/30* (2006.01)
    *G06F 21/60* (2013.01)
    *G06F 21/57* (2013.01)

(56) References Cited

U.S. PATENT DOCUMENTS

| | | | |
|---|---|---|---|
| 7,444,395 B2 | 10/2008 | Sanghvi et al. | |
| 7,451,306 B2* | 11/2008 | Culbert | H04L 41/0806 |
| | | | 713/153 |
| 7,882,537 B2 | 2/2011 | Okajo et al. | |
| 8,042,167 B2 | 10/2011 | Fulp et al. | |
| 8,256,002 B2 | 8/2012 | Chandrashekhar et al. | |
| 8,490,163 B1 | 7/2013 | Harsell et al. | |
| 8,532,978 B1* | 9/2013 | Turner | G06F 17/271 |
| | | | 704/10 |
| 8,607,300 B2 | 12/2013 | Wang | |
| 8,719,919 B2 | 5/2014 | Rice et al. | |
| 8,793,763 B2 | 7/2014 | Williams et al. | |
| 9,514,300 B2* | 12/2016 | Uner | G06F 21/51 |
| 2004/0025016 A1 | 2/2004 | Focke et al. | |
| 2004/0260818 A1 | 12/2004 | Valois et al. | |
| 2005/0273859 A1 | 12/2005 | Chess et al. | |
| 2006/0041936 A1* | 2/2006 | Anderson | H04L 63/02 |
| | | | 726/11 |
| 2006/0161879 A1 | 7/2006 | Lubrecht et al. | |
| 2007/0073673 A1* | 3/2007 | McVeigh | G06F 17/30233 |
| 2008/0034401 A1 | 2/2008 | Wang | |
| 2008/0183603 A1 | 7/2008 | Kothari et al. | |
| 2008/0209501 A1* | 8/2008 | Mayer | G06F 21/604 |
| | | | 726/1 |
| 2008/0216148 A1 | 9/2008 | Bienek et al. | |
| 2010/0005505 A1 | 1/2010 | Gottimukkala et al. | |
| 2010/0082513 A1 | 4/2010 | Liu | |
| 2010/0146582 A1* | 6/2010 | Jaber | G06F 21/6218 |
| | | | 726/1 |
| 2010/0199346 A1 | 8/2010 | Ling et al. | |
| 2013/0246334 A1 | 9/2013 | Ahuja et al. | |
| 2014/0082168 A1 | 3/2014 | Basso et al. | |
| 2014/0109190 A1 | 4/2014 | Cam-Winget et al. | |
| 2014/0165128 A1 | 6/2014 | Auvenshine et al. | |
| 2015/0128116 A1 | 5/2015 | Chen et al. | |
| 2015/0281278 A1* | 10/2015 | Gooding | H04L 63/20 |
| | | | 726/1 |
| 2016/0191476 A1* | 6/2016 | Schutz | H04L 63/06 |
| | | | 713/165 |
| 2016/0344738 A1* | 11/2016 | Dotan | H04L 63/20 |

OTHER PUBLICATIONS

Anonymous: "Creating Firewall Rules (reference)", wiki.ipfire.org, Mar. 29, 2014, pp. 1-5, XP055258932, retrieved from the internet: https://web.archive.org/web/20140329122433/http://wiki.ipfire.org/en/configuration/firewall/rules/start [retrieved on Mar. 16, 2016].

* cited by examiner

INTEGRATED DEVELOPMENT ENVIRONMENT (IDE) FOR NETWORK SECURITY CONFIGURATION FILES

PRIORITY CLAIM

This application claims priority to U.S. Provisional Application No. 62/163,523, filed May 19, 2015, the entirety of which is incorporated herein by reference.

TECHNICAL FIELD

The present disclosure relates to an Integrated Development Environment (IDE) for network security configuration files.

BACKGROUND

Integrated Development Environment (IDE) functionality is a tool for programming languages. Such IDE functionality does not exist for network security device configuration files, such as files that include access control lists (ACLs) used for network security appliances. Thus, network administrators are hampered when working with network security configuration files.

DESCRIPTION OF EXAMPLE EMBODIMENTS

Overview

A method performed in a computer-implemented integrated development environment (IDE) is provided. A configuration file including security rules is preprocessed in the IDE. Each security rule includes multiple security rule parameters to cause a security appliance to apply a network access control when a source attempts to access a destination. At least one of the destination or the source in some of the security rules is represented as a respective object name, where each object name is associated with an object value defined in an object definition in the configuration file. To perform the preprocessing, each object name is mapped to the associated object value based on the object definition for that object name. In response to the configuration file being opened in an editor through which a user interacts with the security rules, the editor is provided with access to results of the preprocessing. Each security rule in the opened configuration file is searched for object names therein. Each object name found in the search is linked to the associated object value mapped thereto by the mapping performed during the preprocessing. A selection of an object name in a security rule of the opened configuration file is received and the associated object value linked to the selected object name is generated for display.

Example Embodiments

Figure 1:
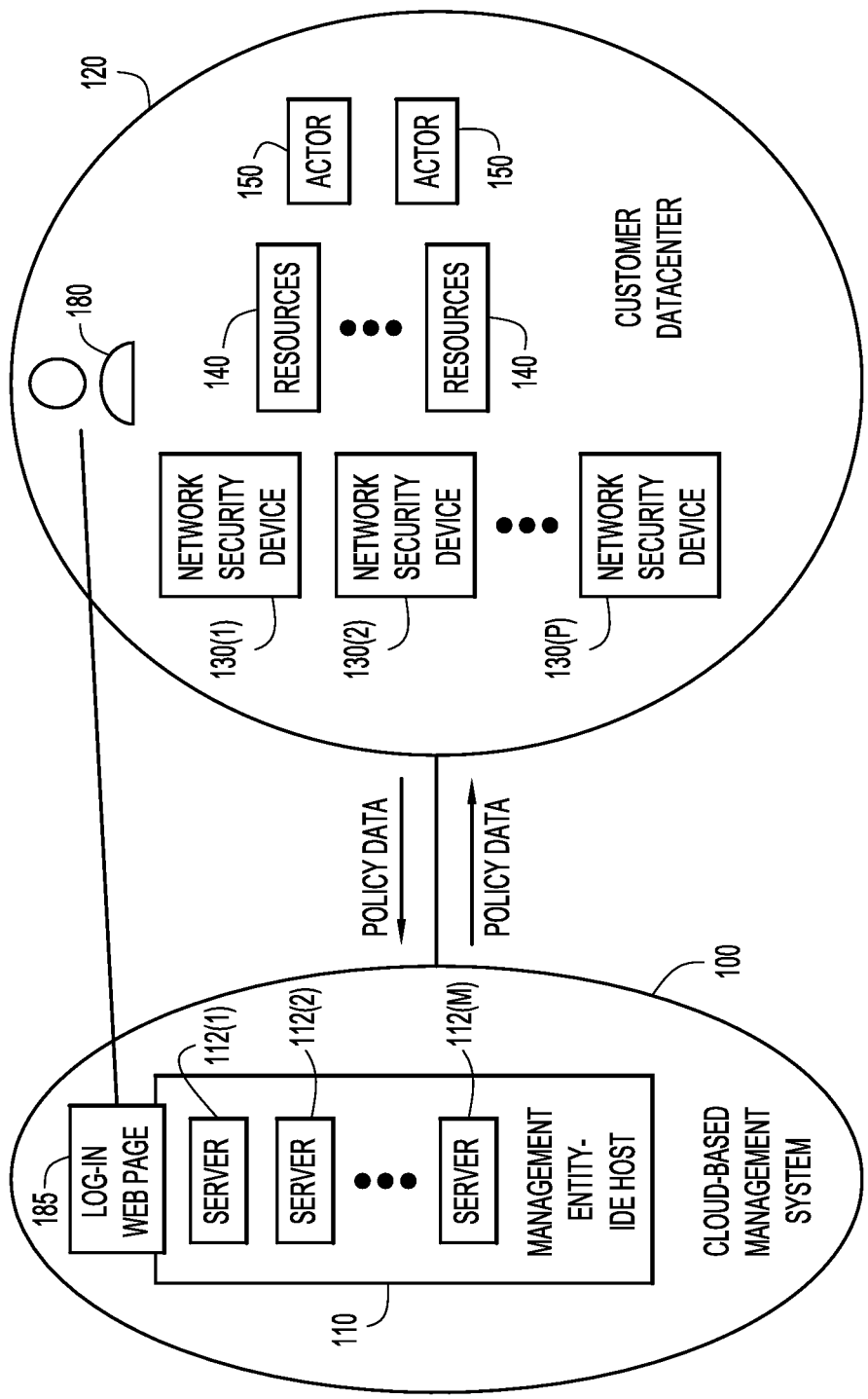
FIG. 1 is a cloud-based management system in which an Integrated Development Environment (IDE) is provided for a network security device configuration file, according to example an embodiment.

With reference to FIG. 1, there is shown a cloud-based management system 100 in which a network security device configuration file Integrated Development Environment (IDE) (referred to simply as an "IDE") may be used, according to an embodiment. Cloud-based management system 100 communicates with network security devices of a customer datacenter 120. FIG. 1 shows the details of one customer datacenter, but it should be understood that the cloud-based management system 100 may connect and communicate with multiple customer datacenters.

The cloud-based management system 100 includes a management entity 110 including one or more computer servers 112(1)-112(M) that execute software to perform the operations associated with an IDE and, in this way, management entity 110 is said to host the IDE. An example of a hardware configuration for management entity 110 is described in more detail below in connection with FIG. 4.

Customer datacenter 120 includes a plurality of network security devices or products (also referred to as network security appliances) 130(1)-130(P). Within a customer datacenter there are one or more resources 140 and one or more actors 150. The resources 140 may include servers, databases, and the actors 150 are users or processes using a computing device (personal computer, SmartPhone, etc.) that may seek access to one or more of the resources 140. The resources and actors may also reside outside the customer datacenter itself, e.g., in the Internet. The network security devices 130(1)-130(P) control access of the actors 150 to the resources 140 according to network security policies, e.g., sets of one or more network security rules configured on the respective network security devices. The IDE hosted in management system 100 may be used to examine, validate, and edit the network security policies.

Figure 2:
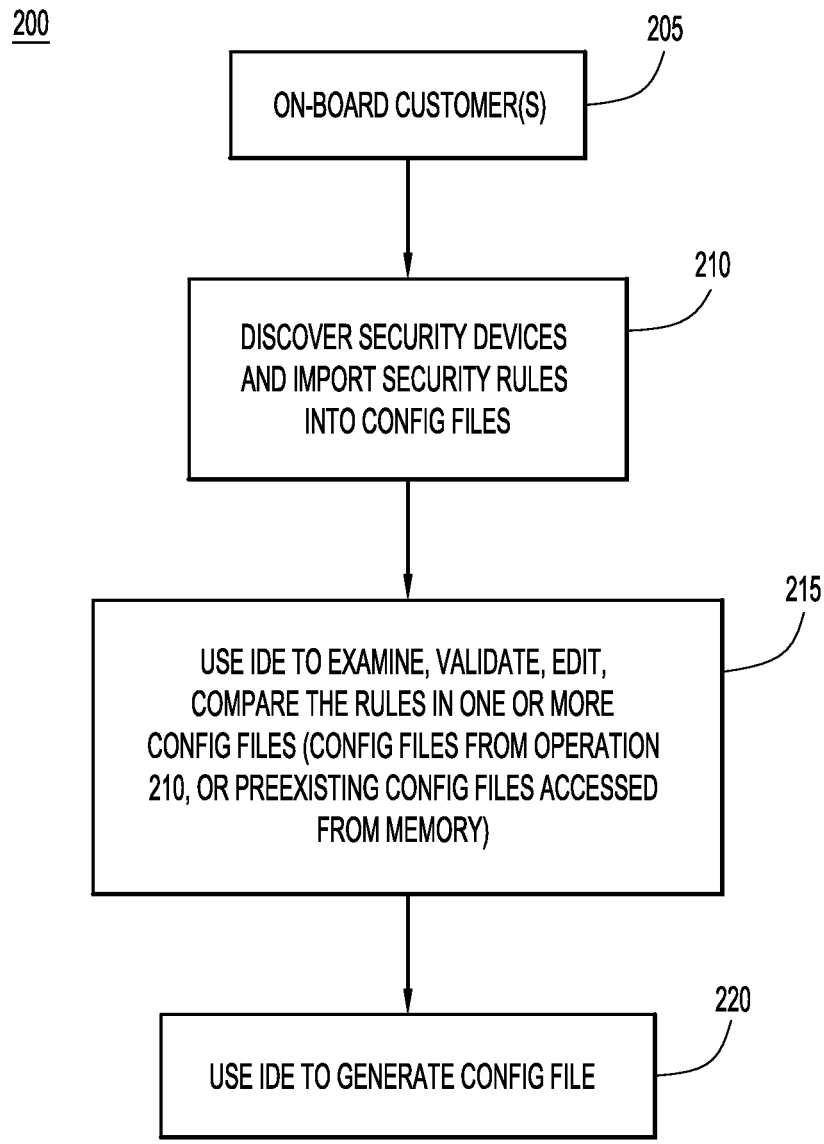
FIG. 2 is a flowchart of a process for the IDE in a network security device, according to an example embodiment.

Turning now to FIG. 2, there is a flowchart of a method 200 of using the IDE in the environment of FIG. 1. FIG. 2 is described with continued reference to FIG. 1. At 205, a customer (e.g., a business or enterprise) is "on-boarded" to cloud-based management system 100. This involves a network administrator/user 180 logging on to a log-on web page 185 served by one of the servers 112(1)-112(M) of the management entity 110. The log-on web page 185 allows network administrator 180 to set up privileges to permit management entity 110 to communicate, over the Internet, with customer datacenter 120 in order to connect to network security devices 130(1)-130(P). In addition, during the initial log-in and setup phase, network administrator 180 provides names and address (e.g., Internet Protocol (IP) addresses) for each of network security devices 130 in customer datacenter 120. Other types of set-up processes may be used other than use of a log-on web page.

At 210, management entity 110 discovers network security devices 130 and may import the policies as policy data from each network security device. Briefly, this involves sending a connection string and device type tag to each network security device 130(i). Each network security device 130(i) responds with device descriptor and policy data for each network security rule configured on the respective network security device. An example subset of the policy data imported form a security device may be:

Protocol: HTTPS
Network: All
Destination: 132.180.0.0/24
Description: Web
Policy: On
Logging: On Management entity 110 stores the discovered data describing the discovered security devices 130 and their native policies. The native policies are stored into respective configuration files (where each configuration file is also referred to as a "config file" or simply a "config"). Each native network security policy may be one or more native network security rules associated with a named network security device and formatted according to a corresponding native policy model for a network security device. Each native network security rule may in turn include a set of security rule parameters to permit or deny network access for the named network security device based on a network protocol, source and destination addresses, and a device port.

At 215, network administrator 180 may invoke the IDE hosted on management entity 110 to display, examine, validate, edit, and/or compare the security rules in one or more of the configuration files created in operation 210 or other preexisting configuration files stored in management entity 110, as described below in connection with FIG. 5.

At 220, administrator/user 180 may also use the IDE to generate and validate new configuration files.

Figure 3:
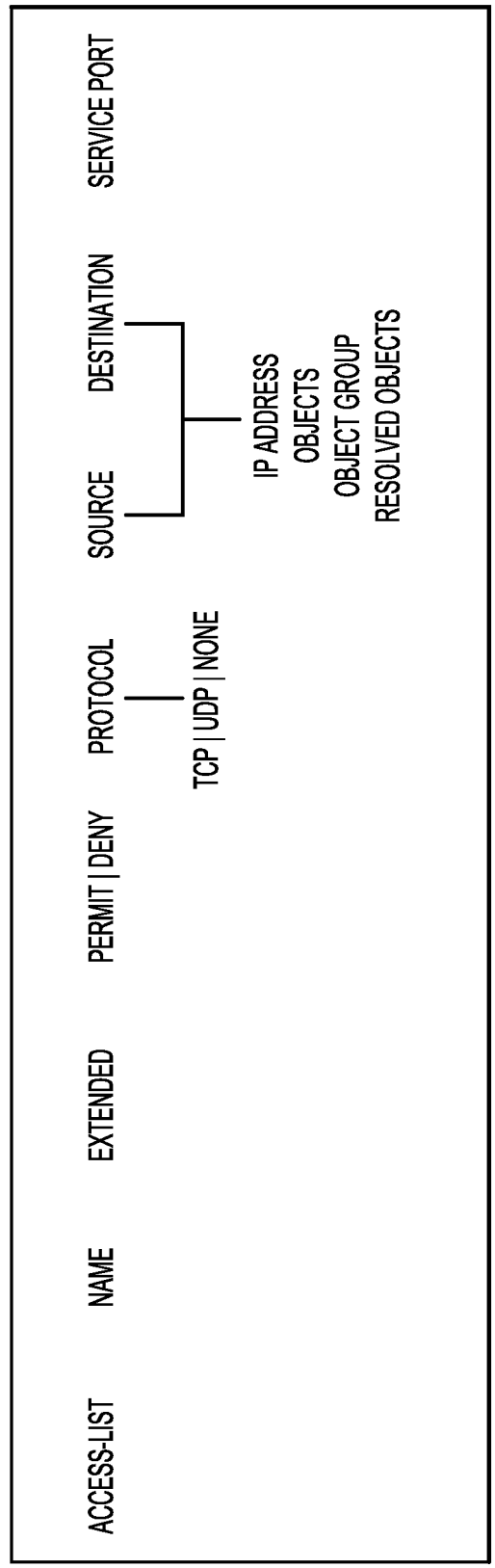
FIG. 3 is an illustration of an example format or syntax for a security rule on which the IDE may operate, according to an example embodiment.

With reference to FIG. 3, there is an illustration of an example format or syntax for an example security rule 300 on which the IDE may operate. Security rule 300 is formatted as an access control list (ACL)—extended rule, in which: "NAME" is an object or object group (i.e., a name of a group of rules); "EXT" is a constant; "PERMIT|DENY" is an access control imposed by the rule; "Protocol" is a communication protocol used for an attempted access and may be expressed as an object or an object group. "S" and "D" may each be a tuple that expresses a service port and address, and may be expressed as either an object or an object group, e.g., "all my inbound email" or "all my outbound email," or called by an object name. S and D may each be identified as a string. In an example, "any" means any port, any address.

Further examples of network security rules that the IDE may operate on include:

1. Access-list left-to-right extended permit ip host 172.16.1.10 host 192.168.1.10.
2. Access-list someName extended permit tcp 172.19.103.0 255.255.255.0 object-group Application-Servers object-group DM_INLINE_TCP_443.
3. Block all users from using facebook messaging.
4. Allow all users to use Linked in but only allow HR to post jobs on Linkedin, allow all users to use Linkedin.

Figure 4:
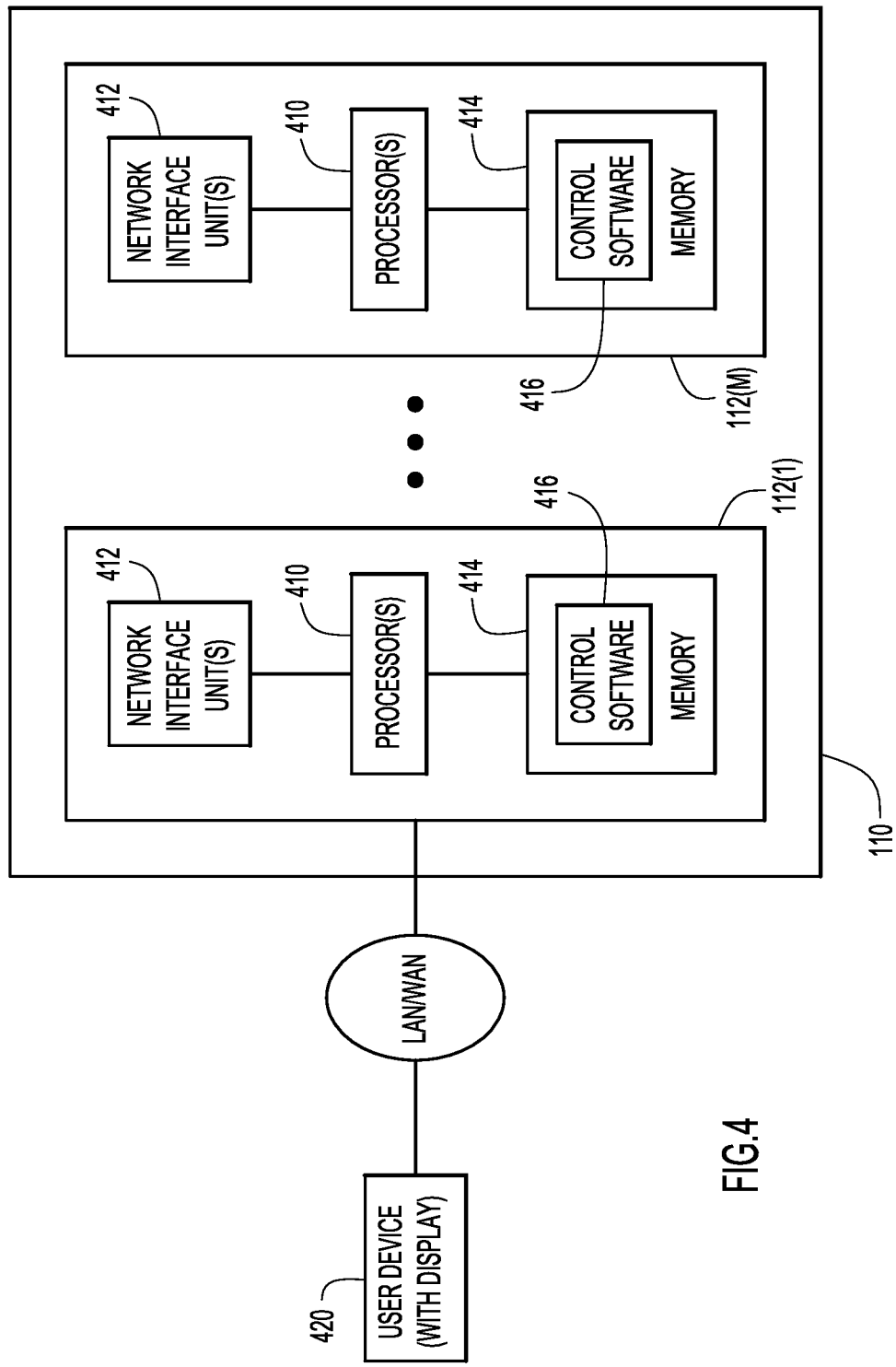
FIG. 4 is a block diagram of an example hardware implementation for a management entity of the cloud-based management system of FIG. 1 that may host the IDE, according to an example embodiment.

Turning now to FIG. 4, a block diagram is shown of an example hardware implementation for the management entity 110. In one example, the management entity 110 includes one or more servers 112(1)-112(M). Each server includes one or more processors 410, one or more network interface units 412 and memory 414. The memory 414 stores control software 416, that when executed by the processor(s) 410, cause the server to perform the various operations described herein for the management entity 110 and the IDE. Local user input/output devices (not shown) may be coupled with management entity 110 to enable a user to enter information and receive information from the management entity. Such devices include, but are not limited to, a display, a keyboard, a mouse, and so on.

The processor(s) 410 may be a microprocessor or microcontroller (or multiple instances of such components). The network interface unit(s) 412 may include one or more network interface cards that enable network connectivity.

The memory 414 may include read only memory (ROM), random access memory (RAM), magnetic disk storage media devices, optical storage media devices, flash memory devices, electrical, optical, or other physically tangible (i.e., non-transitory) memory storage devices. Thus, in general, the memory 414 may comprise one or more tangible (non-transitory) computer readable storage media (e.g., memory device(s)) encoded with software or firmware that comprises computer executable instructions. For example, control software 416 includes logic to implement the operations described herein in connection with the IDE, a security rule editor associated with the IDE, and a User Interface (UI) (such as a Graphical User Interface (GUI)) associated with the IDE. Memory 414 also stores data (not shown) generated and used by the aforementioned logic. For example, the data may include a mapping database to map object names expressed in security rules to object attributes, and security rule classifications, all of which are described below.

Administrator 180 may interact with management entity 110 through UIs by way of a user device 420 that connects by way of a network (local area network (LAN) and/or wide area network (WAN)) with the management entity 110. The user device 420 may be a personal computer (laptop, desktop), tablet computer, SmartPhone, etc.

Figure 5:
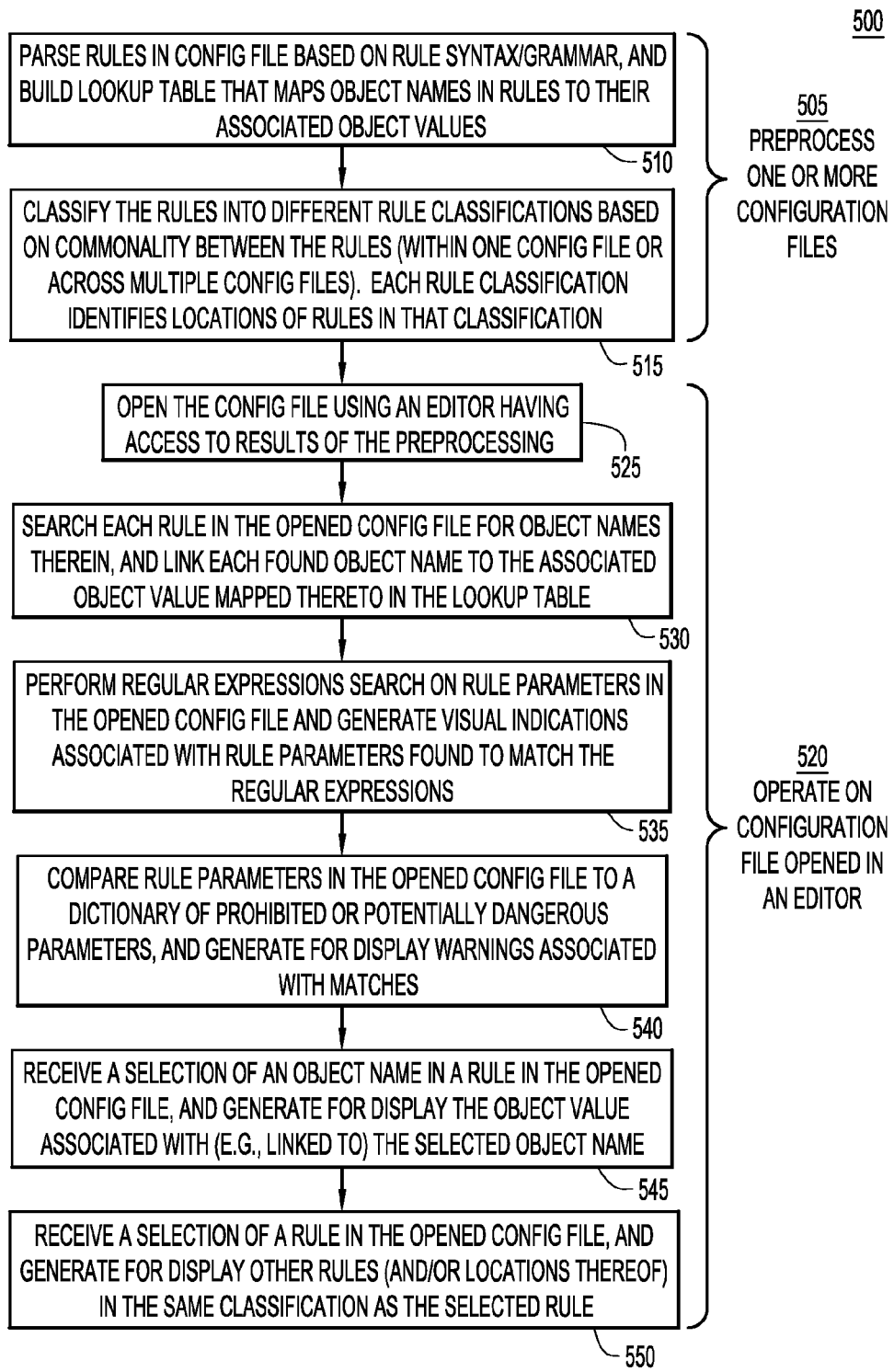
FIG. 5 is a flowchart of an example method of using the IDE to operate on configuration files, according to an example embodiment.

With reference to FIG. 5, there is a flowchart of an example method 500 of using the IDE in cloud-based management system 100 to operate on configuration files, e.g., for network security devices 130. A given configuration file may be a named text file including multiple entries, e.g., sequential lines in the text file, at least some of which correspond to network security rules. Each network security rule includes multiple security rule parameters to cause a network security device to apply a network access control (e.g., permit or deny) when a source (e.g., an IP address or a range of IP addresses) attempts to access a destination (e.g., an IP address or a range of IP addresses). Either the destination or the source (or both) in some of the security rules may be represented as/by a respective object name associated with an object value defined in an object definition of the configuration file. For generality, the object name may name an object group or simply and object. Also, some of the configuration file entries may represent delineated remarks or comments interspersed among the security rules and that have no effect on the security appliance.

At an initial configuration file preprocessing operation 505, user 180 invokes the IDE to access a configuration file and preprocess the accessed configuration file. Operation 505 creates configuration file preprocessing results accessible to and used by subsequent operations 520 (expanded in further operations 525-550) invoked by a user through a configuration file editor that becomes linked with the preprocessing results. The preprocessing results may be stored, for example, in a companion file associated with or linked to the configuration file. Configuration file preprocessing operation 505 includes preprocessing sub-operations 510 and 515, now described. In an embodiment, operation 500 may access and preprocess multiple configuration files.

At 510, the IDE performs a parser operation, described here at a high-level, to parse the security rules in the configuration file based on a native security rule syntax/grammar to build a mapping database, e.g., a lookup table. The mapping database maps object names in security rules to their associated object values.

At 515, the IDE classifies the security rules in the configuration file into different security rule classifications based on commonality between the security rules. In another embodiment in which multiple configuration files are accessed for preprocessing, the IDE classifies the security rules across the multiple configuration files based on commonality between the security rules across the multiple configuration files.

In an embodiment, the IDE classifies the security rules, within one configuration file or across multiple configuration files, into one or more identical security rule classifications based on identicality (i.e., a measure of identicality) between the security rules, such that each identical security rule classification includes security rules that are identical to each other. The IDE also classifies the security rules into one or more similar security rule classifications based on similarity (i.e., a measure of similarity) but not identicality between the security rules, such that each similar security rule classification includes security rules that are similar but not identical to each other. The IDE stores the various security rule classifications in a security rule classification database that also associates each classified security rule with file location, including (i) a name of the configuration file in which the security rule is found, and (ii) a location, e.g., a line number, where the security rule is found in the configuration file.

Operations 505 and 510 generate preprocessing results including but not limited to (i) the lookup table that maps object names to object values, and (ii) the security rule classifications, which are accessed in subsequent IDE operations 520, as described below. Operations 520 include operations 525-550 performed on a configuration file after it has been preprocessed and opened using an editor, such as a text editor, associated with the IDE.

At 525, responsive to user interaction, the user opens the configuration file in an editor, such as a text editor, through which the user interacts with the security rules in the (opened) configuration file. The user may access the editor through the IDE, i.e., the editor may be provided by the IDE. The editor may add line numbers adjacent each of the security rules and remarks in the opened configuration file and display the line numbers along side the aforementioned entries. Responsive to the configuration file being opened in the editor, the IDE links the opened configuration file with the preprocessing results generated in operation 505. To do this, the IDE may link the opened editor to the preprocessing results using an address pointer or a file pointer directed to the preprocessing results. In this way, the IDE makes the preprocessing results accessible to the editor and, as a result, the user may access the preprocessing results through interaction with the editor.

At 530, the IDE searches each security rule in the configuration file for object names therein. The IDE links or maps each found object name in the security rule to the associated object value mapped thereto in the lookup table of the preprocessing results.

At 535, the IDE performs regular expressions searches on security rule parameters in the opened config file and generates for display visual indications associated with security rule parameters found to match the regular expressions.

The regular expression search may include a search of the security rule parameters of each security rule for an object or object group designator (e.g., the label "object" or the label "object-group") followed by an object name. For each found object or object group designator, the IDE generates for display (e.g., via the editor) a visual object or object group indication to visually differentiate the found object or object group designator from other security rule parameters that are not object or object group designators. As a result, for example, each found object or object group designator may be highlighted in blue when displayed by the editor.

The regular expression search may also include a search for delineated remarks interspersed among the security rules and that have no effect on the security appliance. For each found remark, the IDE may generate for display a visual remark indication to visually differentiate the found remark from the security rules. For example, each found remark may be "greyed-out" when displayed by the editor.

The regular expression search may include a search of the security rule parameters of each security rule for a delimiter, such as "access-list" indicating that a current line in the configuration file is dedicated to a security rule. For each found security rule delimiter, the IDE may generate for display a visual security rule indication to visually differentiate the found security rule delimiter.

Other regular expression searches may be performed and their results indicated visually through the editor.

At 540, the IDE compares security rule parameters in the configuration file to a dictionary that defines prohibited or potentially dangerous parameters and corresponding warnings, and generates for display the warnings associated with any found matches. The dictionary may be generated by the administrator before operations 520 are invoked.

At 545, the IDE receives a user selection of an object name in a security rule in the configuration file via the editor. For example, the user may hover a cursor over the object name or use a mouse to click on the object name, which results in the selection of that object name. In response to the selection, the IDE accesses the object value associated with the selected object name that was linked to the object name at previous operation 530. The IDE generates for display (via the editor) the object value linked to the selected object name. If the IDE is unable to access an object value for the selected object name (because there is no object definition for that object name in the configuration file) the IDE generates for display an error message indicating that the selected object name is not defined. Also, if the IDE determines from the mapping database that the selected object name resolves to two different values, the IDE generates for display an error messages indicating an error associated with the selected object name. The aforementioned errors may also be identified and flagged to the user visually during the parser operation 510.

At 550, the IDE receive a user selection of a security rule in the configuration file through the editor, e.g., when the user selects one of the line numbers displayed adjacent a security rule by the editor. In response, the IDE searches for an entry, corresponding to the selected security rule, in any of the security rule classifications that were generated at previous operation 540. If an entry is found in one of the security rule classifications, the IDE generates for display all of the other rules in the one of the classifications along with the file locations of the other rules (e.g., line numbers and filenames for the other rules).

Figure 6:
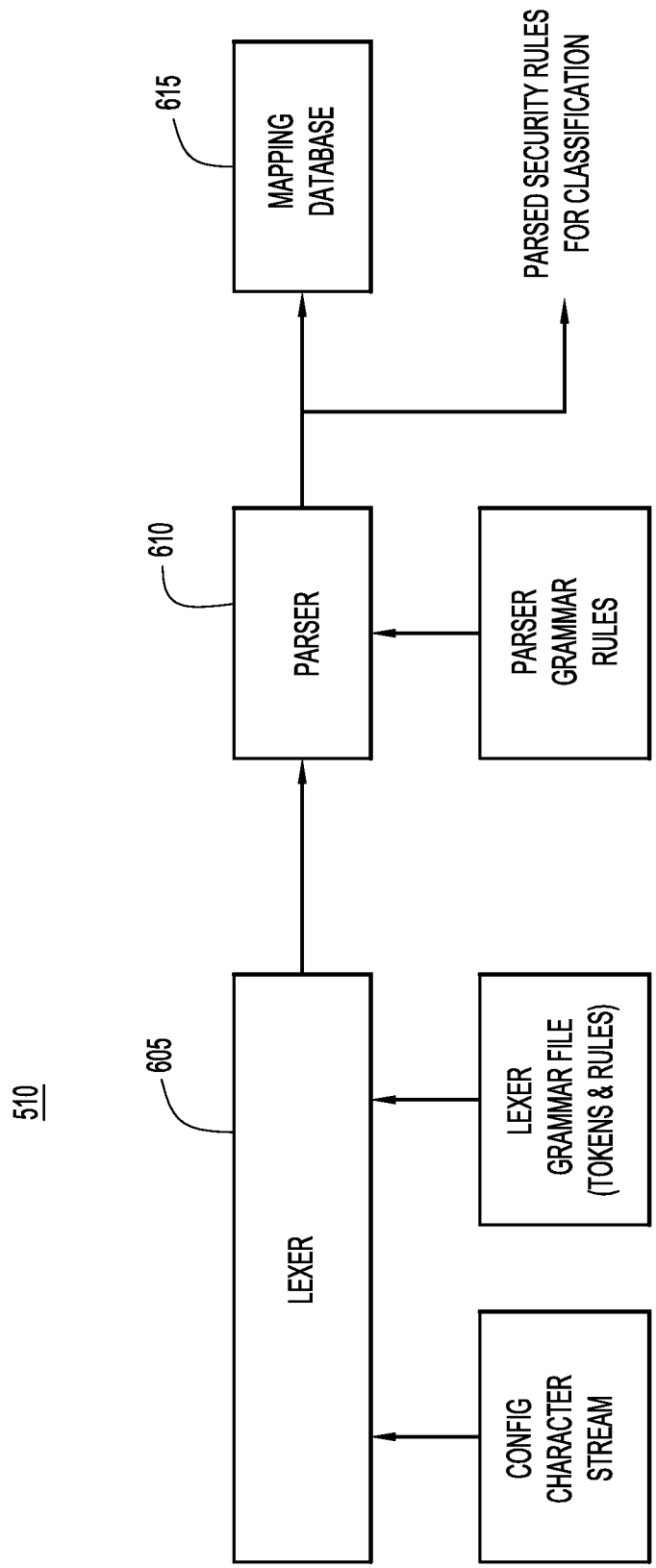
FIG. 6 is a flowchart of a generalized parser operation used of the method FIG. 5, according to an example embodiment.

With reference to FIG. 6, there is a flowchart expanding on high-level parser operation 510 of method 500, according to an embodiment.

A lexer operation 605 (also referred to as "lexer" 605) receives the configuration file, including the security rule parameters of the security rules, the object definitions, and the remarks, in the form of a character stream. Lexer 605 also receives a predetermined lexer grammar file for the security rules including acceptable security rule tokens and grammar rules for the tokens. Lexer 605 tokenizes the security rule parameters of each security rule based on the lexer grammar file to produce a stream of tokens, and delivers the stream of tokens to parser operation 610 (also referred to as "parser 610").

In addition to the stream of tokens, parser 610 receives predetermined parser grammar rules for the security rules. Parser 610 parses the stream of tokens, including object definitions and object names therein, based on the parser grammar rules to build a hierarchical parser tree from the tokens in the stream of tokens. Each time parser 610 encounters an object name while building the parser tree, the parser creates an entry for the object name in the mapping database (indicated at 615 in FIG. 6) that maps the object name to its attributes. Parser 610 searches the object definition tokens for the attributes defined for each object name. The attributes include (i) one or more values associated with the object name as defined in a corresponding configuration file object definition, and (ii) a location in the configuration file, e.g., a line number, of the security rule in which the object name is found. Mapping database 615 may be implemented as a lookup table that uses a hash map to map each object name to its corresponding attributes. Parser 610 also delivers each parsed security rule to security rule classification operation 515, described in detail below.

At operation 515 described above, the IDE classifies security rules into security rule classifications. To do this, the IDE compares each security rule to every other security rule in the configuration file or to every other security rule across multiple configuration files to determine how similar the security rule is to the other security rules based on one or more commonality/similarity criteria. Based on results of the compare, the IDE classifies the security rule into one or more security rule classifications, such as identical classifications or similar classifications. As mentioned above, each security rule typically includes security rule parameters, such as a name of a group of rules (e.g. "inside-in" vs. "inside-out"), an access control (e.g., permit or deny), a protocol (e.g., IP, TCP, UDP, ICMP), a source (e.g., IP address), a destination (e.g., IP address), device/service ports, interfaces, and/or context (e.g. a deny rule surrounded by other deny rules), where some of the security rule parameters may be expressed as an object name or object group name associated with attributes. The security rule parameters represent points of comparison used to classify the security rules. For example, to compare two security rules, their corresponding security parameters or points of comparison are compared, as will be described below.

Figure 7:
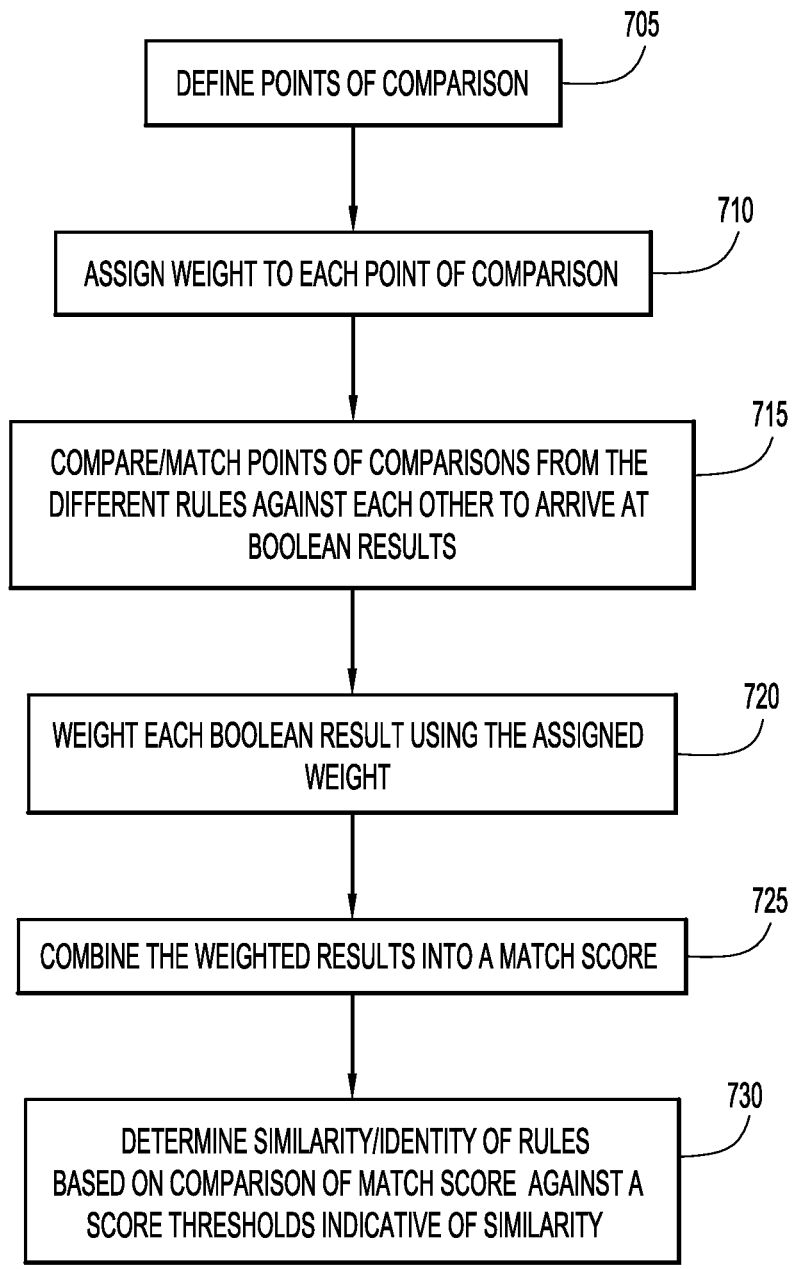
FIG. 7 is a flowchart of operations expanding on a classify operation of the method of FIG. 5, according to an example embodiment.

With reference to FIG. 7, there is a flowchart of operations 700 expanding on classify operation 510 of method 500. Operations 700 determine commonality/similarity between security rules based on their corresponding points of comparison (i.e., corresponding security parameters), and classify the security rules based on results of the determine operation.

At 705, different points of comparison (i.e., security rule parameters) are defined. These points of comparison will form a basis for a determination as to whether different security rules are sufficiently similar as to be placed together into a similar security rule classification or sufficiently identical to be placed together into a an identical security rule classification.

At 710, a weight or coefficient $w_i$ is assigned to each point of comparison.

At 715, corresponding ones of the points of comparison from the different security rules being compared are compared to each other to arrive at a Boolean result, e.g., match=1, no match=0.

At 720, each Boolean result is multiplied by the corresponding assigned weight to produce weighted Boolean results.

At 725, the Boolean results are combined into a match score according to a predetermined expression/equation.

At 730, the match score is compared to a non-zero similarity score threshold and a non-zero identicality score threshold that is greater than the similarity score threshold. If the compare indicates the match score is equal to or greater than the similarity score threshold but less than the identicality score threshold, the different (compared) network security rules are deemed similar to each other and thus classified into the similar security rule classification. If the compare indicates the match score is equal to or greater than the identicality score threshold, the different network security rules are deemed identical to each other and thus classified into the identical security rule classification. If the compare indicates the match score is below the similarity score threshold, the different network security policies are deemed dissimilar to each other and, optionally, may be classified into a unique classification. When a security rule is classified into a similar or identical security rule classification, the security rule is entered into the classification along with a descriptor that identifies the file location (e.g., line number and file name) of that security rule as well as an indicator of the type of commonality, e.g., similar or identical, associated with the classification.

In an example in which operation 705 of method 700 defines as the points of comparison various rule parameters used in the access list—extended model, operation 725 may evaluate the following expression, in which "|match on <point of comparison>?|" defines a match/comparison test that evaluates to a Boolean result:

match score=$w_1$|match on name?|*$w_2$|match on permit/deny?|*$w_3$|match on protocol?|*$w_4$|match on source address?|*$w_5$|match on destination address?|+[$w_6$|match on service ports?|+ $w_7$|match on rule context?|].

In the above equation for match score, both a multiplicative combination and an additive combination of tests results are used. The multiplicative combination is used for points of comparison deemed of higher importance, while the additive combination is used for points of comparison deemed of lower importance. Also, weights $w_i$ may be initially set to 1, but other values may be used. In addition, the similar score threshold may be set to 2 and the identical score threshold may be set to 4, for example, so that if the match score evaluates to 2 or 3, the security rules being compared are deemed similar, and if the match score evaluates to 4 or greater, the security rules being compared are deemed identical, otherwise the security rules are deemed unique.

Figure 8:
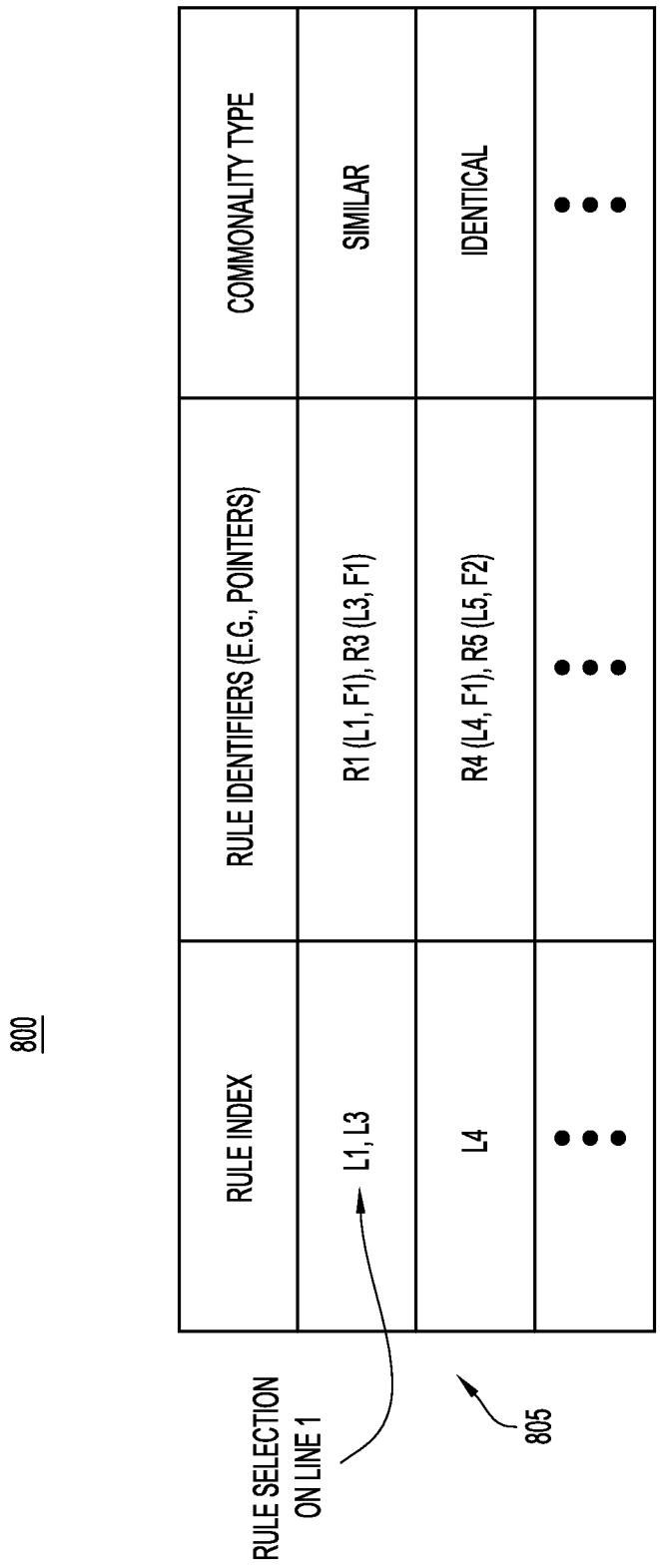
FIG. 8 is an illustration of an example security rule classification database generated by the method of FIG. 7, according to an example embodiment.

With reference to FIG. 8, there is an illustration of an example security rule classification database 800 generated by method 700. In the example of FIG. 8, database 800 is represented as a table having rows 805 each to represent a respective security rule classification into which multiple security rules have been classified. The columns include: a rule index that lists file locations, such as line numbers L1, L2, and so on, that are an index or key to the security rules in the security rule classification for the given row; security rule identifiers including the location (e.g., line number Li and filename Fi) of each security rule Ri in the security rule classification for the given row; and a commonality type for the security rule classification for the given row (e.g., "similar" or "identical"). The security rule identifiers, e.g., line number Li and filename Fi, may include address pointers to a given line number Li in a given named file Fi for a given security rule Ri. In the example of FIG. 8, row 1 represents a similar security rule classification into which similar security rules R1 (located at line L1 in filename F1) and R3 (located at line L3 in filename F1) are classified. Row 2 represents an identical security rule classification into which identical security rules R4 (located at line L4 in filename F1) and R5 (located at line L5 in filename F2) are classified. The information in database 800 may be organized in many different ways, such as in one or more linked lists of classification nodes that each store rule locations and indicators of commonality type.

Security rule classification database 800 may be used in the following manner. At operation 550 described above, the IDE receives a user selection of a security rule through the editor. The IDE uses the line number of the selected rule (available from the editor) as an index to search the rule indexes of classification database 800 for a match. If a match is found, the IDE accesses the rule identifiers and the commonality type in the row (i.e., security rule classification) of database 800 corresponding to the match. The IDE uses the rule identifiers to locate and access the other security rules, from their respective files and line numbers within those files, that are in the same classification as the selected rule and generates for display the other security rules, their locations, and the commonality type. For example, if the selected rule is on line 1 of the file with filename F1, the IDE uses line L1 as the index to find the similar security classification corresponding to row 1 of database 800, and to access information for the other security rule R3 in that classification.

Figure 9:
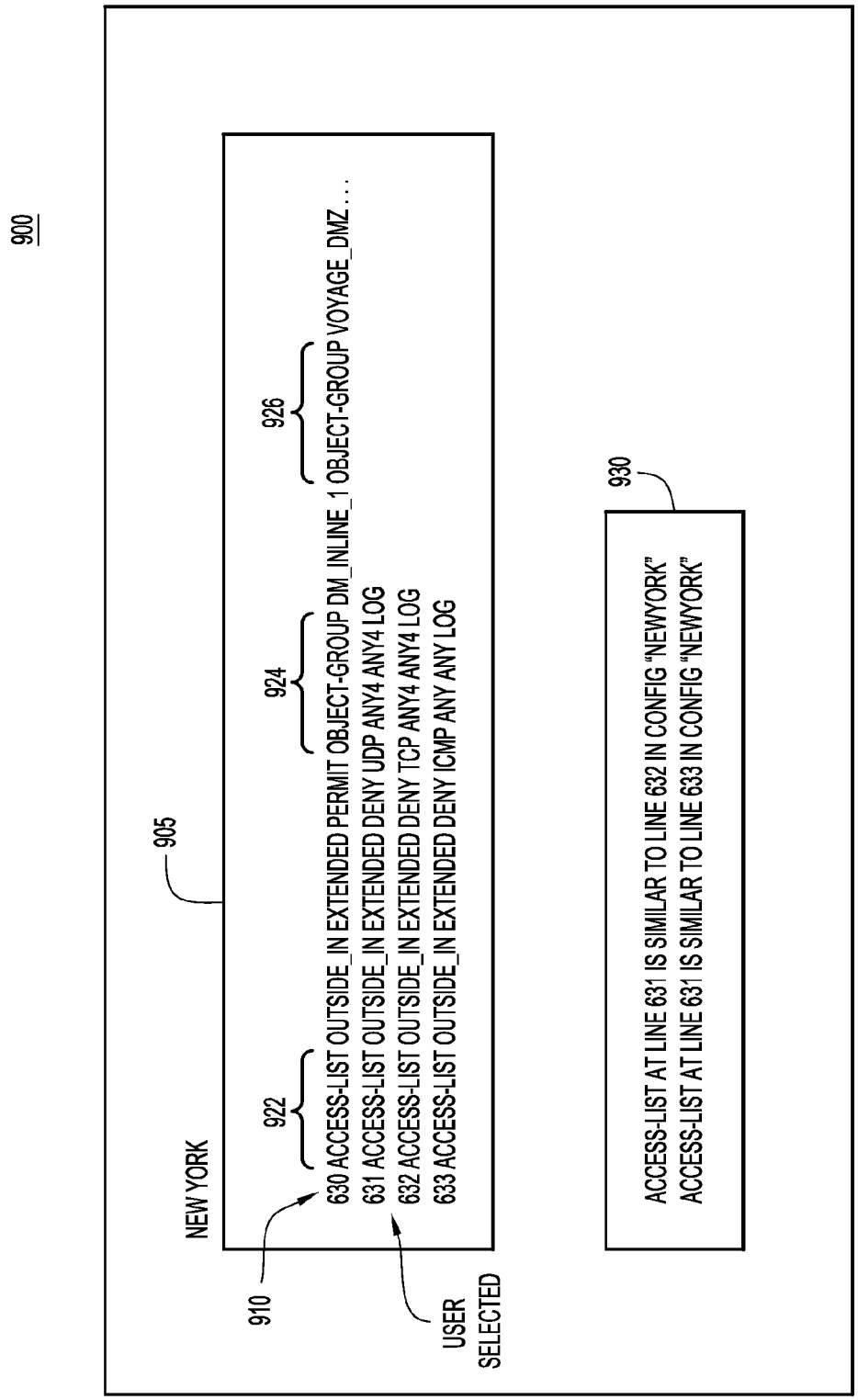
FIG. 9 is an illustration of an example User Interface (UI) displayed by an editor in connection with the IDE and that shows a part of an opened configuration file, according to an example embodiment.

With reference to FIG. 9, there is an illustration of an example User Interface (UI) 900 displayed by an editor responsive to information generated for display in connection with the IDE and that shows a part of an opened configuration file (i.e., "config") named "NEWYORK" in an edit window 905. Edit window 905 shows line numbers 910 for each line of the configuration file. Each line represents a corresponding security rule. In the example of FIG. 9, the security rule parameters include, but are not limited to, a security rule indicator 922 (e.g., access list), an object group designator 924 (e.g., "object-group"), and an object group designator 926. These security rule parameters are all regular expressions found in the regular expression search of operation 535 and are, therefore, highlighted for ease of recognition by the viewer. In line 630, "DM_INLINE_1" and "Voyage_DMZ" are object group names having attributes defined in the object definitions of config NEWYORK (not specifically shown in FIG. 9).

In the example of FIG. 9, the user has selected the security rule on line 631, e.g., by clicking on line number 631. In response, the IDE has searched classifications database 800 linked by the IDE to configuration file NEWYORK and found that the security rule at line 631 belongs to a similar security rule classification indicating similar security rules at lines 632 and 633 of config NEWYORK. Thus, UI 900 also includes a classification window 930 (containing information generated by the IDE and displayed by the IDE) to indicate that the security rules at lines 632 and 633 are similar to the selected security rule at line 631.

Figure 10:
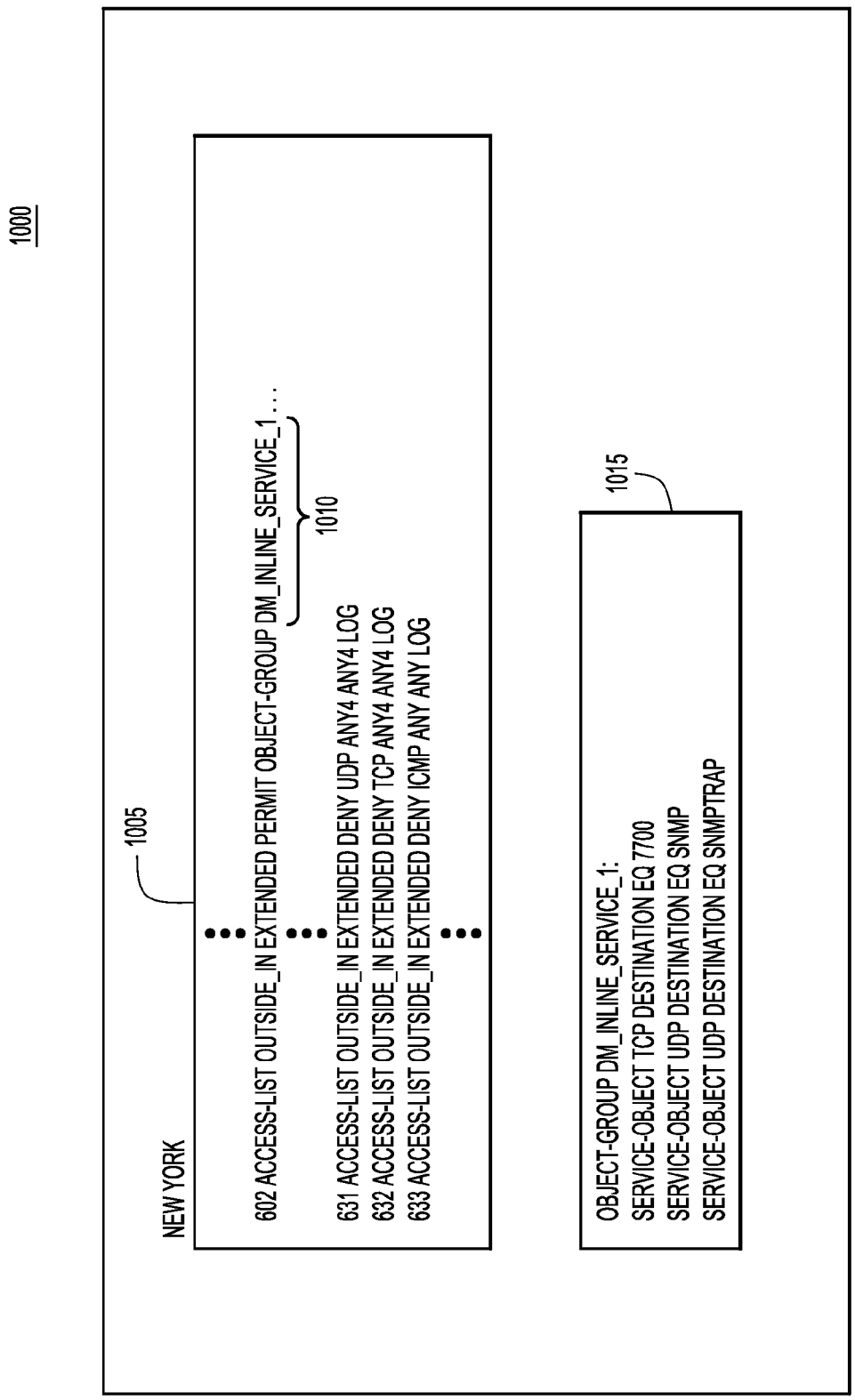
FIG. 10 is an illustration of another example UI displayed by the editor in connection with the IDE, according to an example embodiment.

With reference to FIG. 10, there is an illustration of another example User Interface (UI) 1000 displayed by the editor in connection with the IDE and that shows a part of opened configuration file NEWYORK in an edit window 1005. In the example of FIG. 10, the user has selected object-group name 1010 "DM_INLINE_SERVICE_1." In response to the user selection, the IDE has accessed the attributes linked to object-group name 1010 in the mapping database 615. Thus UI 1000 also includes an attributes window 1015 generated by the IDE that indicates the attributes mapped to the selected object-group.

Figure 11:
FIG. 11 is an illustration of an example dictionary defining prohibited or potentially dangerous parameters, which may be used with the method of FIG. 5, according to an example embodiment.

With reference to FIG. 11, there is an illustration of an example dictionary that defines prohibited or potentially dangerous parameters that may be used in operation 540. In the example of FIG. 11, dictionary 1100 defines/stores a security parameter "any any" and a corresponding warning "warning" to be displayed via a UI should the stored security parameter be found in one of the security rules of a configuration file in operation 540.

Figure 12:
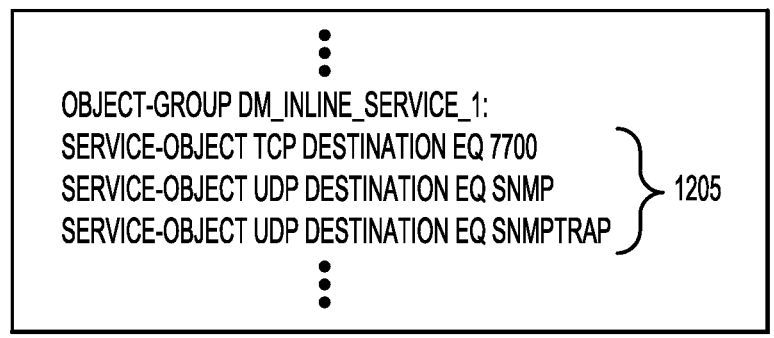
FIG. 12 is an illustration of an entry in a mapping database created by a security rule parser and used in the method of FIG. 5, according to an example embodiment.

FIG. 12 is an illustration of an example entry 1200 in mapping database 615 created and used in the method of FIG. 5, according to an example embodiment. The entry maps the object group name "DM_INLINE_SERVICE_1" to its various attributes 1205 as defined in the corresponding object definitions of the configuration file. The attributes are displayed in connection with selected object group name "DM_INLINE_SERVICE_1" in the UI 1000 of FIG. 10.

In summary, the IDE is used to operate on configuration files in a way that extends functionality beyond that of a mere text editor. The IDE preprocesses a configuration file. Once the configuration is preprocessed, the IDE is able to perform extended configuration file examination functions. For example, the IDE compares each object name used in the security rules against the object definitions and, if the object name is missing from the object definitions, the IDE provides feedback to an administrator/user (via a UI) that the object name is not defined. Also, if the same object name resolves to two different values, this is flagged as an error to the user. The IDE also compares object names in the configuration file against a dictionary of known vulnerabilities and, if a match occurs, warns the user that the object names create known vulnerabilities. For example, security rule parameters such as "any any" may be included in the dictionary of vulnerabilities because any instance of "any any" in any security rule allows "any server to talk to any server" and, therefore, should possibly be flagged as security vulnerability.

The IDE uses syntax highlighting to indicate operational vs. non-operational parts of security rules and to distinguish between security rules and remarks. In syntax highlighting, comments (i.e., remarks) are greyed-out and object names are highlighted. The IDE also exposes/reveals underlying definitions associated with a security rule object name when the object name is selected by a user. To do this the IDE conveniently displays the definition/values of the selected object name parsed earlier so the user does not have to scroll through the file to look for the definitions mapped to the selected object name. The IDE may perform an auto-complete on operations entered by a user into the configuration file and also highlights errors. The IDE compares user selected lines (security rules) in one version of a configuration file against lines in other versions of the file. The IDE displays to the user lines from other configuration files that are the same or similar to a line selected in a current configuration file. The IDE provides the user with immediate visual feedback when the user edits, defines, or simply views a configuration file regarding whether the file is correct or incorrect.

The IDE is integrated with a security rule classifier that identifies identical, similar, and unique rules across multiple configuration files. Assume several configuration files have been imported and the security rules therein have been classified into identical, similar, and unique groups using the rule classifier. In the IDE, the user may select (e.g., click on) a security rule in one configuration file which was found in several of the other configuration files and thus classified as identical to the other rules in the other files. Responsive to the user selection of the rule in the one configuration file, the IDE recognizes that the configuration rule is identical to the other rules from the other configuration files and displays a list that shows the other security rules from the other configuration files and identifies their locations in the other configuration files.

The IDE also performs security rule consistency checking and provides feedback if a security rule entered in a configuration file by the user is inconsistent with an earlier entered security rule. For example, consider a first rule that gives access to everybody to anywhere, then any subsequent more restrictive rule is inconsistent or contradictory and is flagged as such by the IDE. The IDE can flag object names that were not previously defined.

In summary, features of IDE include:
1. An interactive UI that enables the user to visualize many features associated with one or more security configuration files (as follows).
2. Finding identical and similar security rules within and across configuration files, and displaying the results.
3. Performing security rule validation, finding invalid security rules, such as undefined names.
4. Detecting logical security rule misconfigurations, e.g., use of "any any" followed by rules that try to restrict (e.g., Access List inside ACL Ext Permit Any Any—means anyone can access the firewall, so any subsequent rule is inconsistent).
5. Detecting known vulnerabilities based on a dictionary of known vulnerabilities.
6. Syntax highlighting, e.g., shadowing comments (remarks) and highlighting of object names.
7. Syntax validation.

In summary, in one form, a method is provided comprising: in a computer implemented integrated development environment: preprocessing a configuration file including security rules, each security rule including multiple security rule parameters to cause a security appliance to apply a network access control when a source attempts to access a destination, at least one of the destination or the source in some of the security rules represented as a respective object name, each object name associated with an object value defined in an object definition in the configuration file, the preprocessing including mapping each object name to the associated object value based on the object definition for that object name; responsive to the configuration file being opened in an editor through which a user interacts with the security rules, providing the editor with access to results of the preprocessing; searching each security rule in the opened configuration file for object names therein; linking each object name found in the searching to the associated object value mapped thereto by the mapping performed during the preprocessing; and receiving a selection of an object name in a security rule of the opened configuration file and generating for display the associated object value linked to the selected object name.

In another form, an apparatus is provided comprising: a network interface unit configured to enable communications over a network; and a processor, coupled to the network interface unit, configured to, in a computer implemented integrated development environment: preprocess a configuration file including security rules, each security rule including multiple security rule parameters to cause a security appliance to apply a network access control when a source attempts to access a destination, at least one of the destination or the source in some of the security rules represented as a respective object name, each object name associated with an object value defined in an object definition in the configuration file, wherein the processor is configured to preprocess by mapping each object name to the associated object value based on the object definition for that object name; responsive to the configuration file being opened in an editor through which a user interacts with the security rules, provide the editor with access to results of the preprocessing; search each security rule in the opened configuration file for object names therein; link each object name found in the searching to the associated object value mapped thereto by the mapping performed during the preprocessing; and receive a selection of an object name in a security rule of the opened configuration file and generating for display the associated object value linked to the selected object name.

In still a further form, a method is provided comprising: in a computer implemented integrated development environment: preprocessing a configuration file including security rules, each security rule configured to cause a security appliance to apply a network access control when a source attempts to access a destination, the preprocessing including classifying the security rules in the configuration file into security rule classifications based on commonality between the security rules; responsive to the configuration file being opened in an editor through which a user interacts with the security rules, providing the editor with access to results of the preprocessing; receiving a selection of a security rule in the opened configuration file; responsive to the selection, determining whether the selected security rule is classified into any of the security rule classifications; and if it is determined that the selected security rule is classified into one of the security rule classifications, generating for display the security rules in the one of the security rule classifications.

In yet another form, a non-transitory tangible computer readable storage media encoded with instructions is provided. The instructions, when executed by a processor, cause the processor to perform the methods described herein.

The above description is intended by way of example only. Various modifications and structural changes may be made therein without departing from the scope of the concepts described herein and within the scope and range of equivalents of the claims.

What is claimed is:

1. A method comprising:
in a computer-implemented integrated development environment:
preprocessing a configuration file including security rules, each security rule including multiple security rule parameters to cause a network security device to apply a network access control, including either a block access or an allow access, when a source attempts to access a destination, at least one of the destination or the source in some of the security rules represented as a respective object name, each object name associated with an object value defined in an object definition in the configuration file, wherein each of the source, the destination, and the object value is associated with a network address or a range of network addresses, the preprocessing including:
mapping each object name to the associated object value based on the object definition for that object name; and
classifying the security rules into (i) one or more identical classifications each including security rules that are identical to each other, and (ii) one or more similar classifications each including security rules that are similar but not identical to each other, and storing for each classification an index to access the classification, file locations of the security rules in the classification, and either an identical indicator or a similar indicator for the classification;
responsive to the configuration file being opened in an editor configured to interact with the security rules, providing the editor with access to preprocessing results;
searching each security rule in the opened configuration file for object names therein;
linking each object name found in the searching to the associated object value mapped thereto by the mapping performed during the preprocessing; and
receiving a selection of a particular object name in a security rule of the opened configuration file and generating for display the associated object value linked to the selected object name.

2. The method of claim 1, wherein the preprocessing includes:
tokenizing the security rule parameters, including the object names, of each security rule into security rule tokens based on a security rule grammar associated with a security rule syntax; and
parsing the security rule tokens, including the object names into a parser tree based on the security rule syntax,
wherein the mapping includes mapping each object name parsed into the parser tree to the associated object value based on the object definition for the each object name.

3. The method of claim 1, further comprising:
comparing the security rule parameters of each security rule in the opened configuration file to a dictionary of prohibited or potentially dangerous security rule parameters; and
if the comparing indicates a match between a first security rule parameter in a given security rule and one of the prohibited or potentially dangerous security rule parameters of the dictionary, generating for display a warning associated with the given security rule.

4. The method of claim 1, wherein the classifying includes classifying the security rules based on commonality between the security rules, each classification including the security rules that share the commonality for that classification, and the method further comprises:
receiving a selection of a security rule in the opened configuration file;
responsive to the selection of the security rule, determining whether the selected security rule is classified into any of the classifications; and
if it is determined that the selected security rule is classified into one of the classifications, generating for display the security rules in the one of the classifications.

5. The method of claim 4, wherein the generating for display further includes generating for display an indication of the commonality associated with the one of the classifications.

6. The method of claim 4, wherein:
the classifying the security rules into the one or more identical classifications is based on identicality between the security rules; and
the classifying the security rules into the one or more similar classifications is based on similarity but not identicality between the security rules.

7. The method of claim 4, further comprising preprocessing one or more additional configuration files such that the classifying includes classifying the security rules across the configuration file and the one or more additional configuration files into classifications of the security rules based on commonality between the security rules in the configuration file and the one or more additional configuration files, wherein the generating for display further includes generating for display configuration file location information associated with each of the security rules in the one of the classifications.

8. The method of claim 1, further comprising:
performing a regular expressions search of the security rule parameters of each security rule in the opened configuration file for matches to regular expressions defined for the configuration file; and
for each security rule parameter found to match one of the regular expressions, generating for display a visual indication associated with the security rule parameter found to match the one of the regular expressions.

9. The method of claim 8, wherein:
the performing the regular expression search includes searching the security rule parameters of each security rule for an object or object group designator followed by an object name; and
for each found object or object group designator, generating for display a visual object or object group indication to visually differentiate the found object or object group designator from other security rule parameters that are not object or object group designators.

10. The method of claim 8, wherein:
wherein the performing the regular expression search further includes searching the opened configuration file for delineated remarks interspersed among the security rules and that have no effect on the network security device; and
for each found remark, generating for display a visual remark indication to visually differentiate the found remark from the security rules.

11. An apparatus comprising:
a network interface unit configured to enable communications over a network; and
a processor, coupled to the network interface unit, configured to, in a computer implemented integrated development environment:
preprocess a configuration file including security rules, each security rule including multiple security rule parameters to cause a network security device to apply a network access control, including either a block access or an allow access, when a source attempts to access a destination, at least one of the destination or the source in some of the security rules represented as a respective object name, each object name associated with an object value defined in an object definition in the configuration file, wherein each of the source, the destination, and the object value is associated with a network address or a range of network addresses, wherein the processor is configured to:
map each object name to the associated object value based on the object definition for that object name; and
classify the security rules into (i) one or more identical classifications each including security rules that are identical to each other, and (ii) one or more similar classifications each including security rules that are similar but not identical to each other, and store for each classification an index to access the classification, file locations of the security rules in the classification, and either an identical indicator or a similar indicator for the classification;
responsive to the configuration file being opened in an editor configured to interact with the security rules, provide the editor with access to preprocessing results;
search each security rule in the opened configuration file for object names therein;
link each object name found in the searching to the associated object value mapped thereto by the mapping performed during the preprocessing; and
receive a selection of a particular object name in a security rule of the opened configuration file and generating for display the associated object value linked to the selected object name.

12. The apparatus of claim 11, wherein the processor is configured to classify by classifying the security rules based on commonality between the security rules, each classification including the security rules that share the commonality for that classification, and the processor is further configured to:
receive a selection of a security rule in the opened configuration file;
responsive to the selection of the security rule, determine whether the selected security rule is classified into any of the classifications; and
if it is determined that the selected security rule is classified into one of the classifications, generate for display the security rules in the one of the classifications.

13. The apparatus of claim 12, wherein the processor is further configured to classify by:
classifying the security rules into the one or more identical classifications based on identicality between the security rules; and
classifying the security rules into the one or more similar classifications based on similarity but not identicality between the security rules.

14. The apparatus of claim 11, wherein the processor is further configured to:
perform a regular expressions search of the security rule parameters of each security rule in the opened configuration file for matches to regular expressions defined for the configuration file; and
for each security rule parameter found to match one of the regular expressions, generate for display a visual indication associated with the security rule parameter found to match the one of the regular expressions.

15. A method comprising:
in a computer implemented integrated development environment:
preprocessing a configuration file including security rules, each security rule including multiple security rule parameters to cause a network security device to apply a network access control, including either a block access or an allow access, when a source attempts to access a destination, the source and the destination being associated with a network address or a range of network addresses, the preprocessing including classifying the security rules into (i) one or more identical classifications each including security rules that are identical to each other, and (ii) one or more similar classifications each including security rules that are similar but not identical to each other, and storing for each classification an index to access the classification, file locations of the security rules in the classification, and either an identical indicator or a similar indicator for the classification;
responsive to the configuration file being opened in an editor configured to interact with the security rules, providing the editor with access to preprocessing results;
receiving a selection of a security rule in the opened configuration file;
responsive to the selection, determining whether the selected security rule is classified into any of the classifications; and
if it is determined that the selected security rule is classified into one of the classifications, generating for display the security rules in the one of the classifications.

16. The method of claim 15, wherein:
the classifying the security rules into the one or more identical classifications is based on identicality between the security rules; and
the classifying the security rules into the one or more similar classifications is based on similarity but not identicality between the rules.

17. The method of claim 16, wherein:
the generating for display further includes generating for display, for each security rule in the one of the classifications, an indication that the security rule is identical or similar to the selected security rule, and a location in the configuration file where the security rule is found.

18. The method of claim 17, further comprising preprocessing one or more additional configuration files, wherein:
the classifying further includes classifying the security rules across the configuration file and one or more additional configuration files into classifications based on commonality between the security rules in the configuration file and one or more additional configuration files; and the generating for display further includes generating for display configuration file location information associated with each of the security rules in the one of the classifications.

\* \* \* \* \*